May 26, 1970 — N. J. LIPSTEIN — 3,514,647
COOLING ARRANGEMENT FOR DYNAMOELECTRIC MACHINES
Filed Sept. 30, 1968
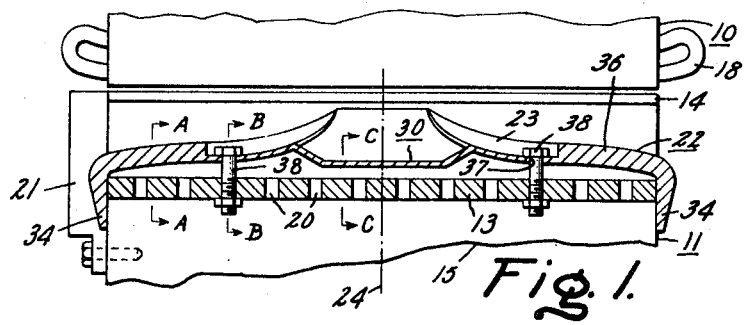
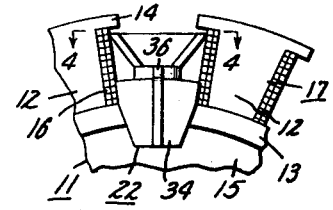
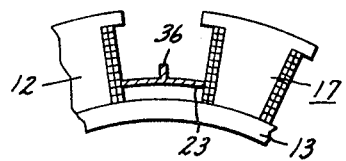
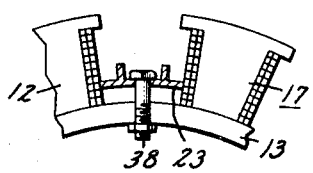
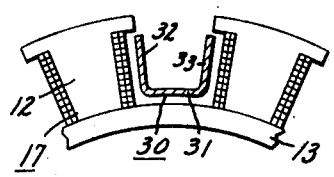
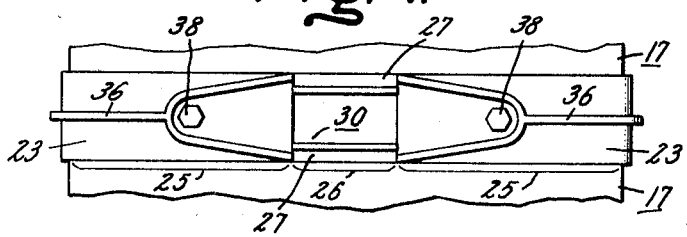
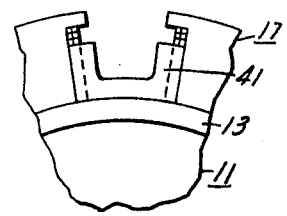
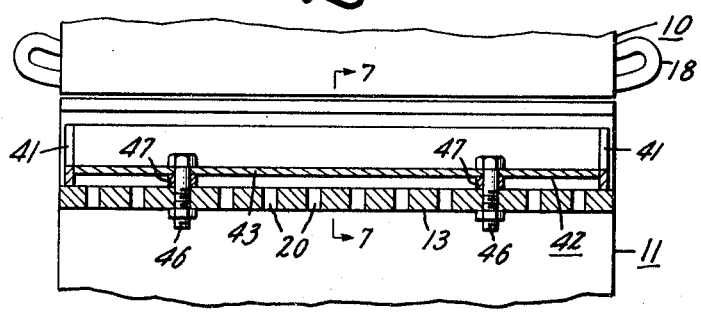
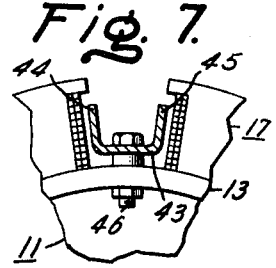
Inventor:
Norman J. Lipstein,
by Julius J. Zaskalicky
His Attorney

United States Patent Office 3,514,647
Patented May 26, 1970

3,514,647
COOLING ARRANGEMENT FOR DYNAMO-
ELECTRIC MACHINES
Norman J. Lipstein, Schenectady, N.Y., assignor to General Electric Company, a corporation of New York
Filed Sept. 30, 1968, Ser. No. 763,662
Int. Cl. H02k 9/00
U.S. Cl. 310—60                                    4 Claims

ABSTRACT OF THE DISCLOSURE

A manifold is provided in each of the spaces between adjacent pole members on the rim of the rotor of a salient pole dynamoelectric machine for separately directing axial flow of air entering from the ends of the pole members and radial flow entering from the interpolar spaces from ducts in the rim. A generally U-shaped member is provided in the central section of the manifold for maintaining a high velocity over the elements of the sides of the pole members and balance the pressure capabilities of the axial and radial flow induction systems.

---

The present invention relates in general to the cooling of dynamoelectric machines and in particular relates to means for ventilating such machines of the salient pole type.

The rotors of large salient pole motors and generators, for example a water wheel generator, are cooled by a combination of radial and axial flows of a gaseous medium, usually air. The radial path of flow includes a plurality of ducts in the magnetic rim of the rotor near the base of the poles and distributed more or less uniformly over the axial extent of the rim. Such slots are usually formed by leaving a gap between the laminations of the rotor. One or more large discrete flow ducts may also be included in the rim itself. Pumping action in such radial paths is due to the centrifugal forces acting on the air in the ducts as the rotor is rotated. Axial flow of air into the interpolar space is from the ends of the poles of the rotor and may be augmented by fans, commonly referred to as "wind bat" fans. However, even without fans axial flow will be large as a result of fan action of the pole members themselves.

In such machines, the two flow paths for ventilation do not act in concert. The radial flow path which has high pressure with low to moderate flow capabilities is directed radially outward into the substantially enlarged cross section of the interpolar space and not directed at the bases of the poles or along the sides of the poles. The axial flow which has high flow and low pressure capability is most effective on the pole ends and near the air gap between the pole tips and the stator, and leaves the axial center plane region of the machine uncooled and also bypasses the bases of the poles. Also, the high velocity, jet-like radial flows directed outward, deflect the axial flow from the ends of the rotor away from central regions thereof. Accordingly, it is apparent that the two flow paths in conventional machines are not constituted so as to direct effectively the cooling air to the surfaces which require it most, namely, the bases of the field poles and the center plane portion of the machine.

The present invention is directed to overcoming such disadvantages in prior art axial and radial ventilated machines.

A primary object of my invention is to provide improved means for directing cooling gas in the interpolar space of a salient pole dynamoelectric machine.

Another object of the present invention is to provide efficient and effective means for cooling the rotor elements of a dynamoelectric machine.

Still another object of the present invention is to provide a simple and inexpensive means to cool the dynamoelectric machines.

A further object of the present invention is to provide means to optimize the radial and axial air flows of dynamoelectric machines to effect a balanced cooling thereof.

In accordance with an illustrative embodiment of the present invention, a manifold is provided which collects the radial flow and confines it to an axially directed conduit at the pole bases and sealed at both ends. The duct is proportioned so that the velocity of air at the base of the poles remains substantially constant within the manifold as it progresses toward the center plane portion of the rotor. The manifold, depending upon the relative magnitude of the rim and axial flows, turns radial at the regions spaced from the ends of the rim and thus directs and confines the radial duct flow to discharge to the air gap over the central portions of the rotor. The axially entering flow is restricted to the opposite side of the manifold partition and thus is forced to enter the air gap over portions of the rotor adjacent to the ends of the pole members and excluding the aforementioned central portions. A U-shaped baffle member is incorporated in the central portions of the manifold for directing the radial duct flow so as to confine the flow to narrow passages along the side surfaces of the pole members, thereby maintaining a high velocity over an extended portion of the sides of the pole members and in the central portions of the rotor. Such restriction of the radially entering flow further acts to dissipate the excess pressure available from the radial induction system of the invention relative to the axial induction system in a manner useful to the cooling function of this air flow.

In accordance with another aspect of the present invention, a generally U-shaped baffle member is provided having a bottom and a pair of side portions extending from one end of the rotor to the other. The bottom portion is spaced from the outside surface of the rim and each of the side portions are spaced from a respective side portion of adjacent pole members. Means are provided for sealing the radially entering flow from escaping out the ends of the rotor without unduly restricting the entry area for axial flow. The cross section of the conduit along the surface of the rim between the sides of the pole members and the sides of the U-shaped member is restricted so as to maintain a good rate of flow therethrough providing efficient and effective cooling of all parts of the pole members.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein:

FIG. 1 is a side view in section of a portion of a dynamoelectric machine including a salient pole rotor and illustrating the disposition of the manifold between adjacent pole members in accordance with the present invention.

FIG. 2 is an end view of the rotor of the apparatus of FIG. 1.

FIGS. 3A, 3B and 3C are side views in section of the rotor of the apparatus of FIG. 1 taken along section lines A—A, B—B and C—C.

FIG. 4 is a view of the apparatus of FIG. 1 taken along section line 4—4 of FIG. 2.

FIG. 5 is a side view in section of a portion of a dynamoelectric machine including a salient pole rotor in accordance with another embodiment of my invention.

FIG. 6 is an end view of the rotor of the apparatus of FIG. 5.

FIG. 7 is an end view of the rotor of the apparatus of FIG. 5 taken along section lines 7—7 of FIG. 5.

Referring now to FIGS. 1 and 2 of the drawings, there is shown a part of a dynamoelectric machine including a stator 10 having a winding 18 thereon and rotor 11. The rotor 11 comprises a plurality of pole pieces 12, only two of which are shown mounted on a rim 13 of magnetic material which may consist of a plurality of laminations forming at one end pole tips 14 each having an overhanging projection and at the other end forming T-shaped wedges secured in a slot in the rim by means well known in the art (not shown). The rim 13 is suitably mounted on a web 15 which in turn is supported by a shaft (not shown). Each of the pole pieces 12 has windings 16 to form the pole member 17 of the rotor. Each of the pole members 17 as viewed from circumferential point looking radially inward is generally oblong in shape having two long sides axially directed and two short sides.

The machine shown is cooled both by radial air flow through the ducts 20 in the rim 13 spaced axially along the length of the rim between adjacent pole members 17 and by axial flow from the ends of the machine. To enhance the axial flow a plurality of fan members 21 may be provided on the rotor, only one of which is shown secured to the rotor by a bolt. To obtain the full cooling effect of both the radial and axial flow paths and also to particularly increase the effectiveness of the radial flow path in cooling the rotor pole members in accordance with the present invention, a plurality of manifold members 22 is provided only one of which is shown in the space between adjacent pole members.

The details of form and arrangement of the manifold member 22 will be described in connection with FIGS. 3A, 3B, 3C and FIG. 4 in addition to FIGS. 1 and 2, wherein like reference numbers designate like elements. Each manifold 22 includes a pair of generally inclined members 23 contoured to extend from the ends of the rim 13 and the sides of the adjacent pole members 17 axially inward and radially outward toward the center plane 34 of the machine. For an axial distance 25 from each end of the rotor, the manifold abuts and is in secure contact with the sides of the adjacent pole members. Such sections will hereinafter be referred to as end sections of the sides of pole members 17. The upward inclined members 23 are directed steeply outward in the radial direction over the central region of the interpolar space and terminate adjacent the air gap between the rotor 11 and the stator 10 in the region of the central section 26 of each of the sides of adjacent pole members. The manifold is spaced from the central section 26 of the sides of the coil 16 to provide a pair of openings 27 therein.

A generally U-shaped baffle member 30 having a bottom portion 31 and a pair of side portions 32 and 33 and of a length corresponding to the axial length of the central section 26 of the side of a pole member is disposed with the bottom portion 31 closely spaced to the outer surface of the rim 13 and each of the side portions of the member 30 closely spaced to respective central section 26 of a side portion of a pole member. Each side of the bottom portion of U-shaped member which does not support the upright portions 32 and 33 thereof is secured to a respective end of the upward extending inclined members 23. A pair of overhanging lips 34 are provided in each of the ends of the manifold member abutting the sides of the rim 13 and a ridge 36 is provided in each of the inclined members for structural support. Each of the members 23 is securely attached to the rotor rim by means of bolts 38, only two of which are shown, extending through holes 37 centrally located in each of the members 23. The manifold 22 including the U-shaped member 30 may be constituted of fiber glass or other suitable non-conducting and non-abrasive material.

In the operation of the machine, the axial flow created by the rotation of the rotor 11 is directed to cool the ends of the pole members, the stator end turns and the stator laminations. Such high volume low pressure flow is directed inward and upward where it passes through appropriate openings in the stator laminations (not shown). The radial flow due to centrifugal forces acting on air included in the ducts of the rotor is relatively low in volume and high in pressure. The inclined portions 23 of the manifold member provide a cross section along the end sections of the interpolar space which is restricted and is adjacent the bases of the pole members. Accordingly, high velocity and good contact is made with the bases of such pole members by the ventilating air. Also, along the central portion of the interpolar space the cross section is restricted between the base portion of the U-shaped member and the outer surface of the rim and also between the sides of the U-shaped member and the sides of the central section of the pole members. Accordingly, instead of such flow energy being dissipated by discharging into a large flow cross section, the high energy flow is maintained over the entire base region of each of the pole members and also is directed upward in the central section of the machine along the sides of the pole members to effectively cool them.

It is apparent that the manifold in accordance with the present invention provides good separation of the axial and radial flows and particularly orients the radial flow to be most effective where it is needed, namely, at the bases of the pole members and particularly along the entire central section of such pole members. The manifold provides a relatively balanced cooling effect over the entire length of the rotor. As the pressure head at the rim is much larger than the pressure head of the axial fan, the manifold and U-shaped baffle section thereof are used to good advantage to restrict the flow cross section both within the manifold and in the radial discharge central section between the side of the U-shaped baffle and the sides of the field pole members. Even though the rim may supply a smaller part of the total ventilation of the machine, the provisions in accordance with the present invention relieve the requirement of axial ventilation to provide cooling of the center of the rotor and the bases of the pole members.

Referring now to FIGS. 5, 6 and 7, wherein like reference numerals designate like or corresponding parts of the embodiment of FIGS. 1 and 2, there is shown another embodiment in accordance with the present invention. In place of the manifold member of FIG. 1, a single baffle member 42 is provided. The baffle member is U-shaped having a generally planar bottom portion 43 closely spaced to the outer surface of the rim 13 of the rotor and a pair of planar portions 44 and 45 each closely and substantially uniformly spaced to a respective side of the pole member 17. The U-shaped member 42 is shown extending from one end of the rotor to the other in the axial direction. It is suitably supported by a plurality of bolts 46, two of which are shown securing the bottom portion 43 to the rim 13. Suitable spacers 47 are provided to provide the proper cross sectional spacing for the conditions of operation of the machine. A pair of U-shaped plates 41 is secured to each U-shaped member, one at each end thereof to seal the radially entering flow from escaping out of the ends of the rotor while allowing entry of axially directed flow over the outer surfaces of the U-shaped member 42. The U-shaped member 42 need not extend to the ends of the rim but may be spaced therefrom.

In the operation of embodiments of FIGS. 5, 6 and 7, the high pressure radial flow is confined to move along a path of restricted cross section between the bottom portion 43 of member 42 and the outer surface of the rim 13 toward the bases of adjacent sides of the field pole members and then upward along each of the sides of the field pole. The restricted cross section along the base and along the sides of the U-shaped member provides good scrubbing action of the sides of the field pole members and hence good cooling. Axial flow takes place along the outside channel formed by the U-shaped member.

While I have shown particular embodiments of my invention, it will, of course, be understood that I do not wish to be limited thereto since many modifications and variations may be made in the structural arrangements shown and in the instrumentalities employed. I contemplate by the appended claims to cover any such modifications as fall within the true spirit and scope of my invention.

What I claim as new and desire to secure by Letters Patent of the United States is:

1. A salient pole rotor comprising:
   a magnetic rim, on which is supported a plurality of pole members, each including a pole piece and a winding, and in which ducts extend radially from an inner portion thereof into spaces between adjacent sides of adjacent pole members,
   a plurality of generally U-shaped members having a bottom portion and a pair of side portions, the bottom portion extending over an area of said rim from one end to the other end thereof, each side portion extending from one end of said rim to the other end thereof and generally parallel to a respective side of a pair of adjacent field pole members,
   means for sealing the radial flow of fluid from escaping from the ends of said rotor,
   whereby radial flow of fluid through ducts in said rim is directed along the bases of said pole members and radially outward along the sides thereof.

2. The combination of claim 1 in which the cross section of the conduits formed between the bottom portion of said generally U-shaped member and said rim and between each side portion thereof and a respective side of a pole member is restricted to direct flow of cooling fluid close to the sides of said pole members.

3. A salient pole rotor comprising:
   a magnetic rim, on which is supported a plurality of pole members, each including a pole piece and a winding, and in which ducts extend radially from an inner portion thereof into spaces between adjacent pole members, each such side including a section centrally located with respect to the ends of said rotor and a pair of end sections,
   a plurality of manifolds, each manifold secured in a respective space between adjacent pole members of said rotor, each manifold including a pair of contoured members, each contoured member extending from a respective edge of said rim axially inward and radially outward to a region adjacent the tips of adjacent pole members, each contoured member abutting adjacent end sections of adjacent sides of adjacent field pole members, whereby axial flow of fluid is directed axially inward from the ends of said spaces between adjacent pole members to the central sections of said sides of adjacent pole members and radially outward toward the tips of said pole members,
   a generally U-shaped member having a bottom portion and a pair of side portions, the bottom portion extending over an area of said rim centrally located with respect to the ends thereof, each side portion extending generally parallel to the central section of a respective side of a pair of adjacent pole members,
   whereby radial flow of fluid through ducts in said rim is directed along the bases of said pole members and radially outward along the central section of the sides thereof.

4. The combination of claim 3 in which each of the sides of said bottom portion of said U-shaped member faces a respective end of said rim and is secured to a respective contoured member to provide an enclosed conduit of restricted cross section to maintain flow close to the outer surface of said rim and adjacent to the bases of said pole members.

References Cited

UNITED STATES PATENTS

| | | | |
|---|---|---|---|
| 3,261,994 | 7/1966 | Franz | 310—61 |
| 3,106,654 | 10/1963 | Wesolowski | 310—269 X |
| 2,974,239 | 3/1961 | Havelka | 310—61 |
| 2,899,573 | 8/1959 | Wesolowski | 310—269 X |

FOREIGN PATENTS

| | | |
|---|---|---|
| 1,459,506 | 10/1966 | France. |
| 1,329,981 | 10/1964 | France. |

D. F. DUGGAN, Primary Examiner

U.S. Cl. X.R.

310—269